(12) United States Patent
Saitoh et al.

(10) Patent No.: US 7,978,298 B2
(45) Date of Patent: Jul. 12, 2011

(54) LIQUID CRYSTAL DISPLAY DEVICE

(75) Inventors: Masaaki Saitoh, Taki-gun (JP);
Toshihiro Matsumoto, Nara (JP);
Tsuyoshi Okazaki, Nara (JP);
Kazuyoshi Fujioka, Higashiosaka (JP);
Katsuya Ogawa, Matsusaka (JP); Tohru Sonoda, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 249 days.

(21) Appl. No.: 12/293,895

(22) PCT Filed: Feb. 20, 2007

(86) PCT No.: PCT/JP2007/053037
§ 371 (c)(1),
(2), (4) Date: Sep. 22, 2008

(87) PCT Pub. No.: WO2007/108268
PCT Pub. Date: Sep. 27, 2007

(65) Prior Publication Data
US 2010/0110352 A1    May 6, 2010

(30) Foreign Application Priority Data

Mar. 23, 2006    (JP) .................................. 2006-081302

(51) Int. Cl.
*G02F 1/1339* (2006.01)
*G02F 1/1335* (2006.01)
*G02F 1/1337* (2006.01)

(52) U.S. Cl. ........ 349/156; 349/114; 349/129; 349/155; 349/157

(58) Field of Classification Search .................. 349/129, 349/114, 155–157
See application file for complete search history.

(56) References Cited

U.S. PATENT DOCUMENTS 4,345,249 A    8/1982    Togashi
(Continued)

FOREIGN PATENT DOCUMENTS

CN    1544985 A    11/2004
(Continued)

OTHER PUBLICATIONS

International Search Report for PCT/JP2007/053037, mailed Mar. 27, 2007.

(Continued)

*Primary Examiner* — Rhonda S Peace
(74) *Attorney, Agent, or Firm* — Nixon & Vanderhye P.C.

(57) ABSTRACT

In a liquid crystal display device which presents display by forming liquid crystal domains that take radially-inclined orientation, persisting display unevenness is prevented from occurring when the panel surface is pressed, thus realizing high-quality displaying.
A liquid crystal display device according to the present invention includes a first substrate, a second substrate provided so as to oppose the first substrate, and a vertical-alignment type liquid crystal layer provided therebetween. The liquid crystal display device according to the present invention further includes wall-like structures regularly arranged on the liquid crystal layer side of the first substrate, such that, when a predetermined voltage is applied, the liquid crystal layer forms at least one liquid crystal domain that takes a radially-inclined orientation state in a region substantially surrounded by the wall-like structures. The second substrate includes a protrusion projecting toward the liquid crystal layer in a region corresponding to the liquid crystal domain, and the liquid crystal layer contains a chiral agent. The thickness $d_{LC}$ of the liquid crystal layer, the natural chiral pitch p of the liquid crystal layer, and the distance $d_{RW}$ from the center of the protrusion to the wall-like structure satisfy the relationships $d_{RW} > p$ and $d_{LC}/p \geq 0.15$.

14 Claims, 9 Drawing Sheets

U.S. PATENT DOCUMENTS

| | | | |
|---|---|---|---|
| 4,889,412 | A | 12/1989 | Clerc et al. |
| 5,508,834 | A | 4/1996 | Yamada et al. |
| 5,666,179 | A | 9/1997 | Koma |
| 5,811,835 | A | 9/1998 | Seiki et al. |
| 6,031,591 | A | 2/2000 | Hamanaka |
| 6,069,740 | A | 5/2000 | Hamanaka |
| 6,129,439 | A | 10/2000 | Hou et al. |
| 6,195,140 | B1 | 2/2001 | Kubo et al. |
| 6,208,395 | B1 | 3/2001 | Kanoh et al. |
| 6,287,899 | B1 | 9/2001 | Park et al. |
| 6,340,998 | B1 | 1/2002 | Kim et al. |
| 6,384,889 | B1 | 5/2002 | Miyachi et al. |
| 6,567,144 | B1 * | 5/2003 | Kim et al. ................. 349/128 |
| 6,661,488 | B1 | 12/2003 | Takeda et al. |
| 6,710,825 | B2 | 3/2004 | Kubo et al. |
| 6,717,642 | B2 | 4/2004 | Sasaki et al. |
| 6,771,346 | B2 | 8/2004 | Sugimoto et al. |
| 6,784,961 | B2 | 8/2004 | Suzuki et al. |
| 6,788,375 | B2 | 9/2004 | Ogishima et al. |
| 6,829,026 | B2 | 12/2004 | Sasaki et al. |
| 6,839,107 | B2 | 1/2005 | Kobashi |
| 6,839,108 | B1 | 1/2005 | Hirakata et al. |
| 6,862,062 | B2 | 3/2005 | Kubo et al. |
| 6,873,384 | B2 | 3/2005 | Yamanaka et al. |
| 6,894,840 | B2 | 5/2005 | Yamanaka et al. |
| 6,924,876 | B2 | 8/2005 | Kubo et al. |
| 6,950,160 | B2 | 9/2005 | Kubo et al. |
| 6,965,422 | B2 | 11/2005 | Kubo et al. |
| 6,967,702 | B2 | 11/2005 | Ishii et al. |
| 6,989,874 | B2 | 1/2006 | Chae |
| 6,995,826 | B2 | 2/2006 | Kubo et al. |
| 7,084,943 | B2 | 8/2006 | Kubo et al. |
| 7,139,055 | B2 | 11/2006 | Ogishima et al. |
| 7,145,624 | B2 | 12/2006 | Kubo et al. |
| 7,202,923 | B2 | 4/2007 | Yamabuchi et al. |
| 7,215,395 | B2 | 5/2007 | Kubo et al. |
| 7,230,664 | B2 | 6/2007 | Kubo et al. |
| 7,253,872 | B2 * | 8/2007 | Kume et al. ................. 349/191 |
| 7,277,146 | B2 | 10/2007 | Maeda |
| 7,292,300 | B2 | 11/2007 | Kubo et al. |
| 7,375,781 | B2 | 5/2008 | Kubo et al. |
| 7,379,137 | B2 | 5/2008 | Kubo |
| 7,391,489 | B2 * | 6/2008 | Kume et al. ................. 349/129 |
| 7,499,136 | B2 | 3/2009 | Kubo |
| 7,505,102 | B2 | 3/2009 | Kubo et al. |
| 7,525,614 | B2 | 4/2009 | Jeong et al. |
| 7,532,291 | B2 | 5/2009 | Kubo et al. |
| 7,554,631 | B2 | 6/2009 | Tashiro et al. |
| 2001/0033353 | A1 | 10/2001 | Shimoshikiryo |
| 2002/0022364 | A1 | 2/2002 | Hatta et al. |
| 2002/0036740 | A1 | 3/2002 | Kubo et al. |
| 2002/0054269 | A1 | 5/2002 | Maeda et al. |
| 2002/0075436 | A1 | 6/2002 | Kubo et al. |
| 2002/0080320 | A1 | 6/2002 | Suzuki et al. |
| 2002/0149728 | A1 * | 10/2002 | Ogishima et al. .......... 349/129 |
| 2002/0191128 | A1 | 12/2002 | Okumura et al. |
| 2003/0089949 | A1 | 5/2003 | Lin et al. |
| 2003/0112213 | A1 | 6/2003 | Noguchi et al. |
| 2003/0186478 | A1 | 10/2003 | Morita et al. |
| 2003/0202144 | A1 * | 10/2003 | Kim et al. ................. 349/129 |
| 2003/0227429 | A1 | 12/2003 | Shimoshikiryo |
| 2003/0231267 | A1 | 12/2003 | Murai et al. |
| 2004/0027702 | A1 | 2/2004 | Matsushita et al. |
| 2004/0070714 | A1 | 4/2004 | Ishii et al. |
| 2004/0135949 | A1 | 7/2004 | Maeda |
| 2005/0030458 | A1 * | 2/2005 | Sasabayashi et al. ....... 349/129 |
| 2005/0041186 | A1 | 2/2005 | Shimoshikiryo |
| 2005/0056127 | A1 | 3/2005 | Yamabuchi et al. |
| 2005/0078251 | A1 * | 4/2005 | Chen et al. ................. 349/129 |
| 2005/0122452 | A1 | 6/2005 | Yoshida et al. |
| 2005/0140876 | A1 | 6/2005 | Kubo |
| 2005/0168674 | A1 | 8/2005 | Kubo |
| 2005/0190322 | A1 | 9/2005 | Okabe et al. |
| 2005/0205870 | A1 | 9/2005 | Yamazaki |
| 2005/0213008 | A1 | 9/2005 | Kubo et al. |
| 2005/0237463 | A1 | 10/2005 | Kubo |
| 2005/0270447 | A1 | 12/2005 | Tasaka et al. |
| 2005/0270462 | A1 * | 12/2005 | Koma ................. 349/129 |
| 2005/0280754 | A1 | 12/2005 | Kume et al. |
| 2006/0055852 | A1 | 3/2006 | Yoshida et al. |
| 2006/0119776 | A1 | 6/2006 | Kubo et al. |
| 2006/0139541 | A1 | 6/2006 | Yamaguchi et al. |
| 2006/0158574 | A1 | 7/2006 | Kubo et al. |
| 2006/0278874 | A1 | 12/2006 | Kubo et al. |
| 2006/0291065 | A1 | 12/2006 | Hasei et al. |
| 2007/0019132 | A1 | 1/2007 | Kim et al. |
| 2007/0097293 | A1 | 5/2007 | Nakanishi et al. |
| 2007/0139594 | A1 | 6/2007 | Kubo et al. |
| 2007/0146591 | A1 | 6/2007 | Kimura et al. |
| 2007/0199504 | A1 | 8/2007 | Nakamura et al. |
| 2007/0216827 | A1 | 9/2007 | Okada et al. |
| 2008/0002079 | A1 | 1/2008 | Kimura |
| 2008/0266499 | A1 | 10/2008 | Kubo |
| 2009/0185119 | A1 | 7/2009 | Kikuchi et al. |
| 2009/0195740 | A1 | 8/2009 | Imai et al. |
| 2009/0195741 | A1 | 8/2009 | Hara et al. |
| 2009/0284683 | A1 | 11/2009 | Usukura et al. |
| 2010/0007815 | A1 | 1/2010 | Kosegawa et al. |
| 2010/0014031 | A1 | 1/2010 | Kikuchi et al. |
| 2010/0020263 | A1 | 1/2010 | Murao et al. |
| 2010/0039583 | A1 | 2/2010 | Usukura |
| 2010/0045885 | A1 | 2/2010 | Imai et al. |
| 2010/0045917 | A1 | 2/2010 | Imai et al. |
| 2010/0053517 | A1 | 3/2010 | Imai et al. |
| 2010/0060813 | A1 | 3/2010 | Kawashima et al. |
| 2010/0118227 | A1 | 5/2010 | Shibata et al. |
| 2010/0118238 | A1 | 5/2010 | Shimada et al. |

FOREIGN PATENT DOCUMENTS

| | | |
|---|---|---|
| EP | 0 645 661 A1 | 3/1995 |
| EP | 1 701 202 A1 | 9/2006 |
| JP | 63-21907 B2 | 5/1988 |
| JP | 63-296004 | 12/1988 |
| JP | 1-129234 | 5/1989 |
| JP | 02-149802 | 6/1990 |
| JP | 4-372934 | 12/1992 |
| JP | 05-188364 | 7/1993 |
| JP | 5-333328 | 12/1993 |
| JP | 06-034966 | 2/1994 |
| JP | 6-331831 | 12/1994 |
| JP | 07-027913 | 1/1995 |
| JP | 08-148254 | 6/1996 |
| JP | 8-190089 | 7/1996 |
| JP | 9-54318 A | 2/1997 |
| JP | 10-325953 | 12/1998 |
| JP | 11-095197 | 4/1999 |
| JP | 11-109390 | 4/1999 |
| JP | 11-237625 A | 8/1999 |
| JP | 11-242225 A | 9/1999 |
| JP | 11-295697 | 10/1999 |
| JP | 11-337961 | 12/1999 |
| JP | 2000-010124 | 1/2000 |
| JP | 2000-249807 | 9/2000 |
| JP | 2000-329906 | 11/2000 |
| JP | 2001-021862 A | 1/2001 |
| JP | 2001-201619 | 7/2001 |
| JP | 2001-337323 | 12/2001 |
| JP | 2002-236283 | 8/2002 |
| JP | 2003-035824 | 2/2003 |
| JP | 2003-43525 A | 2/2003 |
| JP | 2003-270636 | 9/2003 |
| JP | 2003-280548 | 10/2003 |
| JP | 2003-297850 A | 10/2003 |
| JP | 2003-315803 | 11/2003 |
| JP | 2003-337207 | 11/2003 |
| JP | 2004-258366 | 9/2004 |
| JP | 2004-264653 | 9/2004 |
| JP | 2004-325503 | 11/2004 |
| JP | 2005-128082 | 5/2005 |
| JP | 2005-157105 A | 6/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |

| | | |
|---|---|---|
| JP | 2006-184334 | 7/2006 |
| JP | 2006-184673 | 7/2006 |
| JP | 2006-220711 | 8/2006 |
| JP | 2006-220922 | 8/2006 |
| JP | 2006-293410 | 10/2006 |
| JP | 2007-101843 | 4/2007 |
| JP | 2007-133037 | 5/2007 |
| JP | 2007-329099 | 12/2007 |
| JP | 2008-242307 A | 10/2008 |
| KR | 2003-058012 A | 7/2003 |
| KR | 2003-058140 A | 7/2003 |

OTHER PUBLICATIONS

Co-pending U.S. Appl. No. 12/081,752, filed Apr. 21, 2008, entitled Liquid Crystal Display Device.

Co-pending U.S. Appl. No. 11/997,563, filed Feb. 1, 2008, entitled Liquid Crystal Display Device and Electronic Device Using Same.

English translation of the International Preliminary Report on Patentability mailed Oct. 30, 2008 in corresponding PCT Application No. PCT/JP2007/053037.

U.S. Appl. No. 12/666,461, filed Dec. 23, 2009, entitled "Liquid Crystal Display Device and Method of Manufacturing Liquid Crystal Display Device".

U.S. Appl. No. 12/446,099, filed Apr. 17, 2009, entitled "Liquid Crystal Display Device and Method of Manufacturing Liquid Crystal Display Device".

U.S. Appl. No. 12/446,071, filed Apr. 17, 2009, entitled "Liquid Crystal Display and Method of Manufacturing Liquid Crystal Display".

U.S. Appl. No. 12/664,983, filed Dec. 16, 2009, entitled "Liquid Crystal Display Device".

Kalantar, "Viewing Angle Control Using Optical Microstructures on Light-Guide Plate for Illumination System of Mobile Transmissive LCD Module", *IDW'02*, pp. 549-552.

Funamoto et al, "Prism-Sheetless High Bright BackOlight System for Mobile Phone", *IDW'04*, pp. 687-690.

Suqita et al, "Brightness Enhancement in Transflective LCD by Concentration of Uniaxially Collimated Light with a Micro-Lenticular Lens", , IDW 2007, pp. 1515-1518.

Kubo et al., "Development of High-Performance ASV-LCDs Using Continuous Pinwheel Alignment (CPA) Mode", pp. 1-5, Jun. 7, 2001.

KR Notice of Reasons for Rejection and English translation thereof mailed Apr. 25, 2006 in corresponding Korean application No. 10-2004-0110955.

International Search Report for PCT/JP2006/315142 mailed Aug. 22, 2006.

English translation of the International Preliminary Report on Patentability mailed Feb. 14, 2008 in corresponding PCT Application No. PCT/JP2006/315142.

EP Supplementary Search Report mailed Dec. 17, 2009 in EP application 07791179.0.

EP Supplementary Search Report mailed Dec. 29, 2009 in EP application 07806137.1.

Office Action mailed Jun. 23, 2010 in related U.S. Appl. No. 11/997,563 (9 pages).

International Search Report for PCT/JP2007/073231, mailed Feb. 12, 2008 (1 page).

International Preliminary Report on Patentability mailed Jul. 2, 2009 in corresponding PCT Application No. PCT/JP2007/073231 (6 pages).

* cited by examiner (a)

(b)

(a)

(b)

(c)

(a)

(b)

(a)

(b)

(c)

(b)

(b)

(b)

(b)

(a)

(b)

(a)

TRANSMISSION REGION A | REFLECTION REGION B (b)

TRANSMISSION REGION A | REFLECTION REGION B

LIQUID CRYSTAL DISPLAY DEVICE

This application is the U.S. national phase of International Application No. PCT/JP2007/053037, filed 20 Feb. 2007 which designated the U.S. and claims priority to Japanese Application No. 2006-081302, filed 23 Mar. 2006, the entire contents of each of which are hereby incorporated by reference.

TECHNICAL FIELD

The present invention relates to a liquid crystal display device, and in particular to a liquid crystal display device which is suitably used in mobile information terminals (e.g., PDAs), mobile phones, liquid crystal displays for vehicle mounting, digital cameras, personal computers, amusement devices, television sets, and the like.

BACKGROUND ART

In recent years, on the strength of being thin and having a low power consumption, liquid crystal display devices are broadly used in laptop-type personal computers, mobile phones, information devices such as electronic organizers, camera-integrated VTRs having a liquid crystal monitor, and the like.

As a display mode which can realize a high contrast and a wide viewing angle, a vertical alignment mode utilizing a vertical-alignment type liquid crystal layer is drawing attention. In general, a vertical-alignment type liquid crystal layer is formed by using a liquid crystal material having negative dielectric anisotropy and vertical alignment films.

For example, Patent Document 1 discloses a liquid crystal display device whose viewing angle characteristics are improved by allowing an oblique electric field to be generated near an aperture that is provided in a counter electrode which opposes a pixel electrode via a liquid crystal layer, and around a liquid crystal molecule within the aperture which is in a vertical alignment state, allowing the surrounding liquid crystal molecules to take an inclined orientation.

However, with the construction described in Patent Document 1, it is difficult to form an oblique electric field across the entire region within the pixel. This leads to a problem in that regions in which the liquid crystal molecules have a slow response to voltage occur within the pixel, thus causing an afterimage phenomenon.

In order to solve this problem, Patent Document 2 discloses a technique in which, regularly-arranged apertures are provided in the pixel electrode or the counter electrode to form a plurality of liquid crystal domains exhibiting radially-inclined orientation within the pixel.

Moreover, Patent Document 3 discloses a technique which involves regularly providing a plurality of protrusions within the pixel to form liquid crystal domains in radially-inclined orientation that are centered around the protrusions.

Furthermore, Patent Document 4 discloses a technique in which the radially-inclined orientation of liquid crystal domains which are formed by orientation restriction structures provided on one of the substrates is stabilized by the orientation restriction force of protrusions which are provided on the other substrate.

On the other hand, in recent years, a liquid crystal display device which is capable of high-quality displaying in both outdoor and indoor situations has been proposed (e.g. Patent Documents 5 and 6), and is used in electronic equipment for mobile use, e.g., mobile phones, PDAs, and hand-held game machines. This liquid crystal display device, which is referred to as a transflective type (or transmission/reflection combination type) liquid crystal display device, has a reflection region which presents display in a reflection mode and a transmission region which presents display in a transmission mode, both within the pixel.

An ECB mode, a TN mode, and the like are used for transflective type liquid crystal display devices which are commercially available at present. Patent Document 3, supra, discloses a construction in which the vertical alignment mode is applied not only to a transmission type liquid crystal display device but also to a transflective type liquid crystal display device.

[Patent Document 1] Japanese Laid-Open Patent Publication No. 6-301036
[Patent Document 2] Japanese Laid-Open Patent Publication No. 2000-47217
[Patent Document 3] Japanese Laid-Open Patent Publication No. 2003-167253
[Patent Document 4] Japanese Laid-Open Patent Publication No. 2003-315803
[Patent Document 5] Japanese Patent No. 2955277
[Patent Document 6] specification of U.S. Pat. No. 6,195,140

DISCLOSURE OF INVENTION

Problems to be Solved by the Invention

As described above, by using the technique disclosed in Patent Document 4, it is possible to stabilize the radially-inclined orientation of liquid crystal domains by means of the orientation restriction force of protrusions. However, according to a detailed study carried out by the inventors, radially-inclined orientation cannot be sufficiently stabilized by merely providing protrusions. Specifically, when a panel surface is pressed with a finger, display unevenness occurs because the orientation of the liquid crystal molecules is disturbed, and this display unevenness may not be eliminated for a long time.

In electronic equipment for mobile use, where the panel surface is frequently pressed, the aforementioned persisting display unevenness is a considerable problem. Persisting display unevenness also presents a large problem in a liquid crystal display device for vehicle mounting. In order to eliminate display unevenness, it is necessary to temporarily zero the applied voltage across the liquid crystal layer in order to promote reorientation of the liquid crystal molecules. However, a liquid crystal display device for vehicle mounting needs to be constantly presenting display, thus making it impossible to perform such a manipulation.

The present invention has been made, at least in part, in view of the aforementioned points, and an objective thereof is to, in a liquid crystal display device which presents display by forming liquid crystal domains that take radially-inclined orientation, prevent persisting display unevenness from occurring when the panel surface is pressed, thus realizing high-quality displaying.

Means for Solving the Problems

A liquid crystal display device according to an embodiment of the present invention includes a first substrate, a second substrate provided so as to oppose the first substrate, and a vertical-alignment type liquid crystal layer provided between the first substrate and the second substrate; the liquid crystal display device having a plurality of pixels, each pixel including a first electrode formed on the first substrate, a second electrode formed on the second substrate, and the liquid crystal layer provided between the first electrode and the second electrode; the liquid crystal display device comprising wall-like structures regularly arranged on the liquid crystal layer side of the first substrate; and when a predetermined voltage is applied, the liquid crystal layer forming at least one liquid crystal domain that takes a radially-inclined orientation state in a region substantially surrounded by the wall-like structures, wherein, the second substrate includes a protrusion projecting toward the liquid crystal layer in a region corresponding to the liquid crystal domain; the liquid crystal layer contains a chiral agent; and a thickness $d_{LC}$ of the liquid crystal layer, a natural chiral pitch p of the liquid crystal layer, and a distance $d_{RW}$ from a center of the protrusion to the wall-like structure satisfy the relationships $d_{RW}>p$ and $d_{LC}/p \geqq 0.15$. Thus, the aforementioned objective is met.

In a preferred embodiment, the thickness $d_{LC}$ of the liquid crystal layer and a height R of the protrusion satisfy the relationship $0.5 \leqq R/d_{LC} < 1$.

A liquid crystal display device according to another embodiment of the present invention includes a first substrate, a second substrate provided so as to oppose the first substrate, and a vertical-alignment type liquid crystal layer provided between the first substrate and the second substrate, the liquid crystal display device having a plurality of pixels, each pixel including a first electrode formed on the first substrate, a second electrode formed on the second substrate, and the liquid crystal layer provided between the first electrode and the second electrode; the liquid crystal display device comprising wall-like structures regularly arranged on the liquid crystal layer side of the first substrate; and when a predetermined voltage is applied, the liquid crystal layer forming at least one liquid crystal domain that takes a radially-inclined orientation state in a region substantially surrounded by the wall-like structures, wherein, the second substrate includes a protrusion projecting toward the liquid crystal layer in a region corresponding to the liquid crystal domain; and a thickness $d_{LC}$ of the liquid crystal layer and a height R of the protrusion satisfy the relationship $0.5 \leqq R/d_{LC} < 1$. Thus, the aforementioned objective is met.

In a preferred embodiment, the first electrode has a plurality of apertures or recessed portions formed in predetermined positions.

In a preferred embodiment, the protrusion is provided in a region corresponding to a substantial center of the liquid crystal domain.

In a preferred embodiment, each of the plurality of pixels includes a transmission region for presenting display in a transmission mode and a reflection region for presenting display in a reflection mode.

EFFECTS OF THE INVENTION

A liquid crystal display device according to one or more aspects of the present invention includes wall-like structures regularly arranged on the liquid crystal layer side of one of a pair of substrates which oppose each other via a vertical-alignment type liquid crystal layer, such that the directions in which liquid crystal molecules are tilted are defined by the anchoring action (orientation restriction forces) of the side slopes of the wall-like structures. As a result, when a predetermined voltage (voltage which is equal to or greater than a threshold value) is applied across the liquid crystal layer, a liquid crystal domain that takes a radially-inclined orientation state is formed within a region substantially surrounded by the wall-like structures. On the other substrate, a protrusion projecting toward the liquid crystal layer is provided in a region corresponding to the liquid crystal domain, such that the radially-inclined orientation of the liquid crystal domain is stabilized by the orientation restriction force of this protrusion.

According to a first aspect of the present invention, the liquid crystal layer has a chiral agent, the thickness $d_{LC}$ of the liquid crystal layer, the natural chiral pitch p of the liquid crystal layer, and the distance $d_{RW}$ from the center of the protrusion to the wall-like structures satisfy the relationships $d_{RW}>p$ and $d_{LC}/p \geqq 0.15$. In other words, the natural chiral pitch p of the liquid crystal layer is prescribed to be smaller than the distance $d_{RW}$ from the center of the protrusion to the wall-like structure, and not too large (specifically, 1/0.15 times or less) relative to the thickness $d_{LC}$ of the liquid crystal layer. Thus, by prescribing the natural chiral pitch p to be equal to or less than a predetermined value, twist structures of liquid crystal molecules become likely to occur within the pixel, so that even when the panel surface is pressed to cause a disturbance in orientation, reorientation of liquid crystal molecules easily occurs, and display unevenness is quickly eliminated.

According to a second aspect of the present invention, the thickness $d_{LC}$ of the liquid crystal layer and the height R of the protrusion satisfy the relationship $0.5 \leqq R/d_{LC} < 1$. In other words, the height R of the protrusion is prescribed to be equal to or greater than a half of the thickness $d_{LC}$ of the liquid crystal layer. Thus, by prescribing the height R of the protrusion to be equal to or greater than a predetermined value, the orientation restriction force (due to an anchoring action of the surface of the protrusion) of the protrusion increases; therefore, even when the panel surface is pressed to cause a disturbance in orientation, reorientation of liquid crystal molecules easily occurs, so that display unevenness is easily eliminated.

As described above, according to the present invention, in a liquid crystal display device which presents display by forming liquid crystal domains that take radially-inclined orientation, it is possible to prevent persisting display unevenness from occurring when the panel surface is pressed, thus realizing high-quality displaying.

Figure 1:
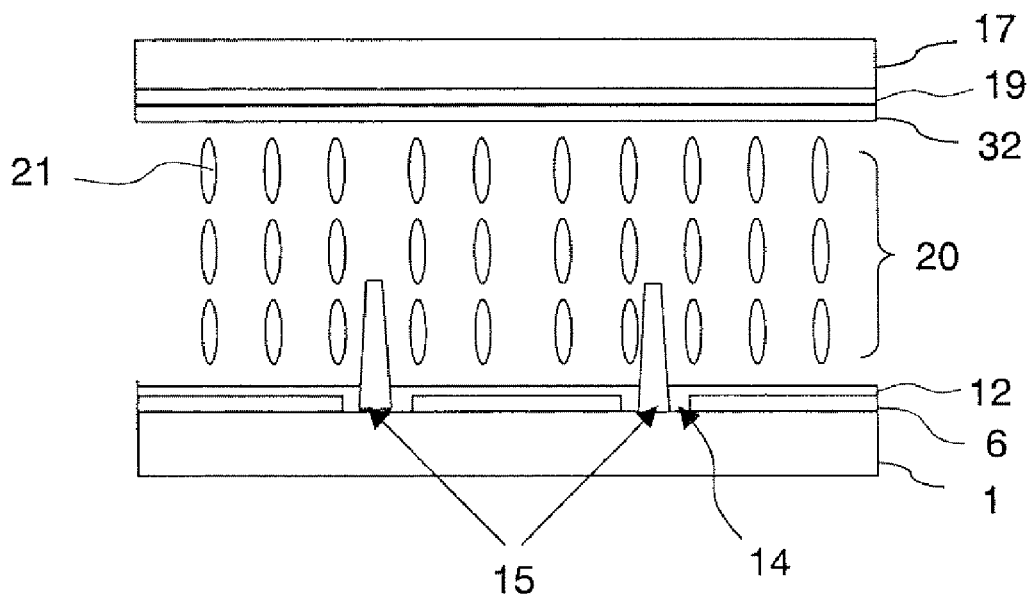
FIG. 1 Schematic illustrations for explaining operation principles of a liquid crystal display device according to a preferred embodiment of the present invention, where: (a) illustrates absence of an applied voltage; and (b) illustrates presence of an applied voltage.
Figure 1:
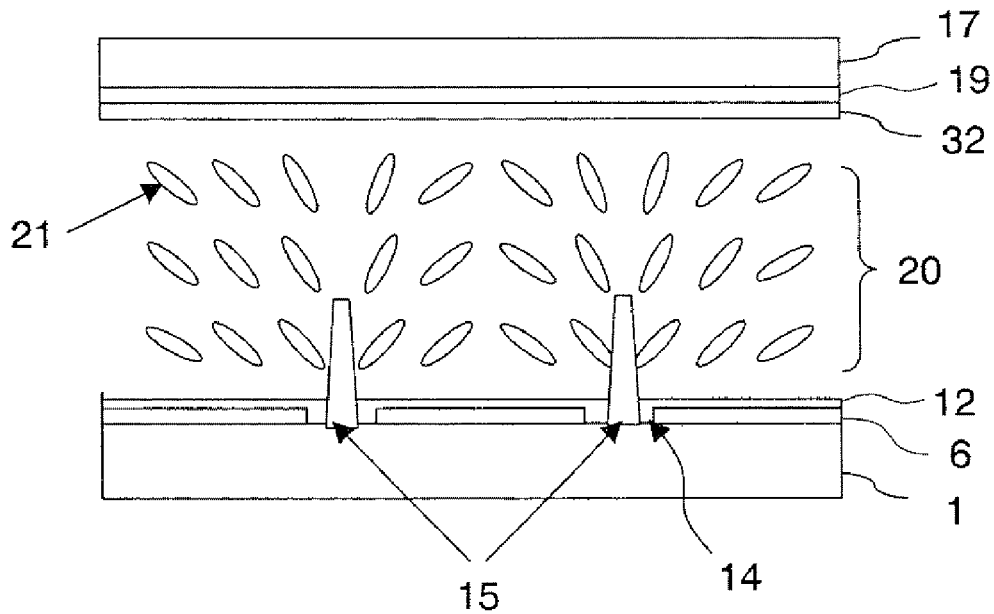

DESCRIPTION OF THE REFERENCE NUMERALS 1 transparent substrate (TFT substrate)
6 pixel electrode
12, 32 vertical alignment film
13 recessed portion
14 aperture
15 wall-like structure
17 transparent substrate (counter (CF) substrate)
19 counter electrode
20 liquid crystal layer
21 liquid crystal molecule
25 protrusion
100 transmission type liquid crystal display device
110a active matrix substrate
110b counter substrate (color filter substrate)
111 pixel electrode
113 recessed portion
115 wall-like structure
130 color filter layer
131 counter electrode
133 support
200 transmission/reflection combination type liquid crystal display device
210a active matrix substrate
210b counter substrate (color filter substrate)
211 pixel electrode
213 recessed portion
215 wall-like structure
225 protrusion
230 color filter layer
231 counter electrode
232 light shielding layer (black matrix)
233 support
234 transparent dielectric layer (reflecting portion's stepped portion)

BEST MODE FOR CARRYING OUT THE INVENTION

Hereinafter, an embodiment of the present invention will be described with reference to the drawings. Note that the present invention is not limited to the following embodiment.

First, with reference to FIG. 1 and FIG. 2, the mechanism by which radially-inclined orientation is created in a liquid crystal display device of the present embodiment will be described.

Figure 2:
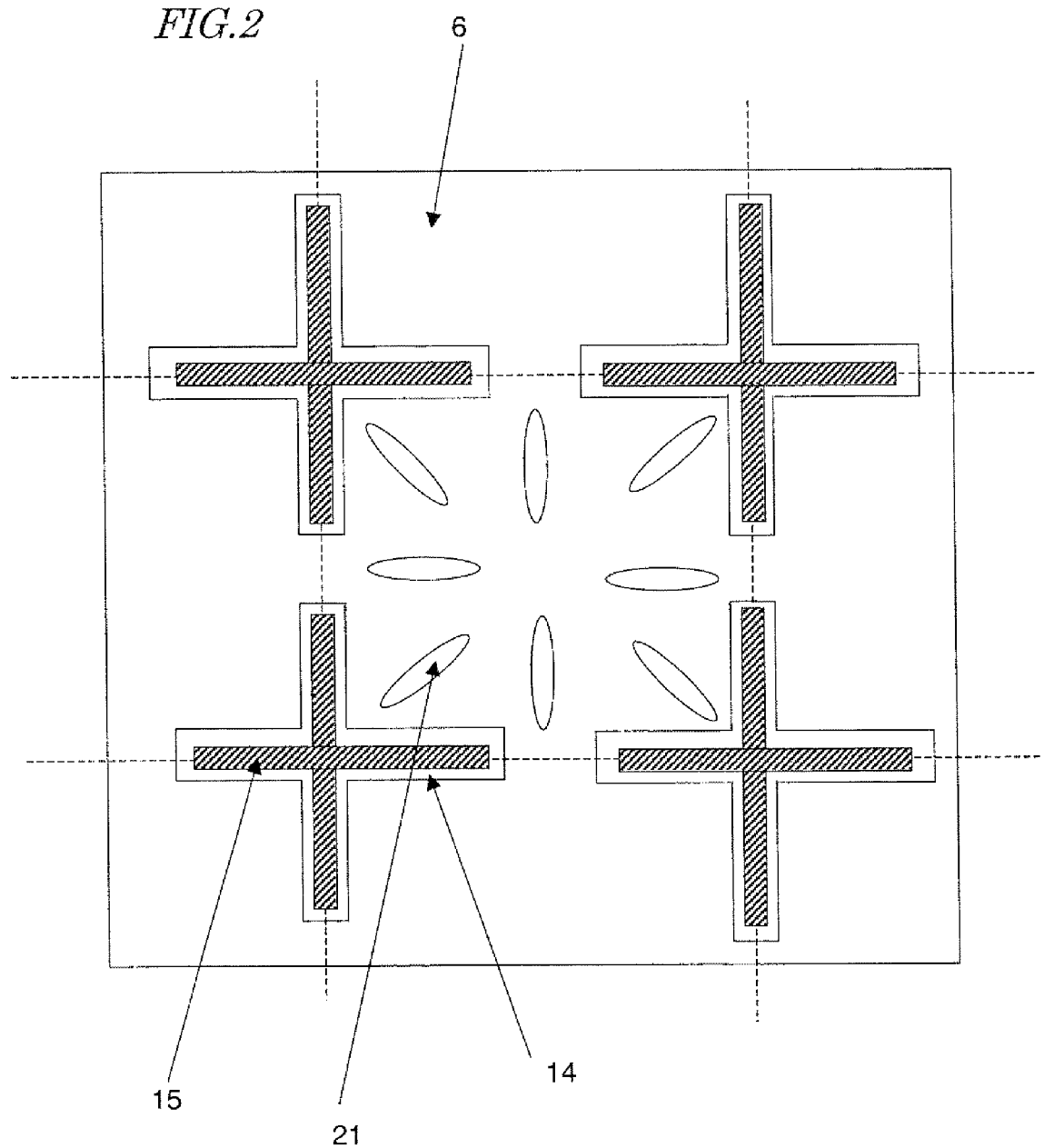
FIG. 2 A schematic illustration explaining operation principles of a liquid crystal display device according to an embodiment of the present invention, as a plan view showing an orientation state of liquid crystal molecules under an applied voltage.

FIG. 1 is diagrams for explaining the action of orientation restriction forces due to apertures 14 and wall-like structures 15 which are provided for a pixel electrode FIG. 1(a) schematically shows an orientation state of liquid crystal molecules in the absence of an applied voltage; and FIG. 1(b) shows an orientation state of liquid crystal molecules under an applied voltage. Moreover, the state shown in FIG. 1(b) is a state of displaying a gray scale level. FIG. 2 is a diagram (plan view) showing an orientation state of liquid crystal molecules in a gray-scale displaying state from a substrate normal direction.

The liquid crystal display device shown in FIG. 1 includes, on a transparent substrate 1, the pixel electrode 6 having the apertures 14 and a vertical alignment film 12 in this order. On another transparent substrate 17, a counter electrode 19 and a vertical alignment film 32 are formed in this order. A liquid crystal layer 20 provided between these substrates contains liquid crystal molecules 21 having negative dielectric anisotropy.

As shown in FIG. 1(a), in the absence of an applied voltage, the liquid crystal molecules 21 are aligned substantially perpendicularly to the substrate surface due to the orientation restriction forces of the vertical alignment films 12 and 32. Typically, the vertical alignment film 12 is formed so as to cover the wall-like structures 15, and, near the slanted side faces of the wall-like structures 15, the liquid crystal molecules 21 are aligned substantially perpendicularly to the side faces; for simplicity, however, such is omitted from the figure. Herein, as shown in FIG. 2, four apertures 14 are provided, in each of which rectangular portions are arranged so as to constitute a cross. The wall-like structures 15 are provided within the apertures 14 so as to be in parallel to the rectangular portions, in such a manner that the directions of their orientation restriction forces (directions in which the liquid crystal molecules are inclined) coincide with the directions of the orientation restriction forces due to oblique electric fields which are generated by the apertures 14.

Under an applied voltage, as shown in FIG. 1(b), the liquid crystal molecules 21 having negative dielectric anisotropy are inclined so that their molecular major axes are perpendicular to the electric lines of force. Therefore, the directions in which the liquid crystal molecules 21 are defined by the oblique electric fields which are generated around the apertures 14. When the cross apertures 14 and wall-like structures 15 are provided as shown in FIG. 2, liquid crystal domains of radially-inclined orientation are formed in the regions which are substantially surrounded by the apertures 14 and wall-like structures 15.

In each such liquid crystal domain, the liquid crystal molecules 21 are oriented in almost all azimuthal directions (all azimuthal directions within the substrate plane), so that the liquid crystal display device of the present embodiment has excellent viewing angle characteristics. Herein, radially-inclined orientation is synonymous with axisymmetric orientation. Around the center of radially-inclined orientation (center axis of axisymmetric orientation), the liquid crystal molecules 21 are continuously oriented without forming disclination lines, and the major axes of the liquid crystal molecules 21 are oriented in a radial, tangential, or spiral manner. In either case, the major axes of the liquid crystal molecules 21 have components which are radially-inclined from the center of orientation (components which are parallel to the oblique electric fields).

An example is illustrated herein where the apertures 14 are formed in addition to the wall-like structures 15. However, even if the apertures 14 are omitted, the directions in which the liquid crystal molecules 21 are tilted under an applied voltage will be defined by the anchoring action (orientation restriction forces) of the side slopes of the wall-like structures 15. As a result, when a voltage which is equal to or greater than a threshold value is applied, liquid crystal domains which take radially-inclined orientation will be stably formed in the regions which are substantially surrounded by the wall-like structures 15.

When the apertures 14 are provided in addition to the wall-like structures 15 as illustrated, the orientation restriction forces due to the oblique electric fields that are generated around the apertures 14 under an applied voltage define the directions in which the liquid crystal molecules 21 are tilted, in cooperation with the orientation restriction forces due to the wall-like structures 15, whereby the radially-inclined orientation can be further stabilized. Whereas the orientation restriction forces due to the oblique electric fields will become weaker as the voltage becomes lower, the orientation restriction forces due to the wall-like structures 15 do not depend on voltage, and therefore exhibit orientation restriction forces also in a gray-scale displaying state, stably defining the directions in which the liquid crystal molecules 21 are tilted. As a result, the display quality during gray-scale displaying can be improved.

Note that "a region substantially surrounded by" wall-like structures 15 (or apertures 14) may be any region within which the wall-like structures 15 (or the apertures 14) is able to exert an orientation restriction force on the liquid crystal molecules 21 in a continuous manner to create a single liquid crystal domain; the wall-like structures 15 (or apertures 14) do not need to completely surround that region in a physical sense. In other words, as shown in FIG. 2, adjoining wall-like structures 15 (or apertures 14) may be split apart, with one liquid crystal domain being created among them.

Figure 3:
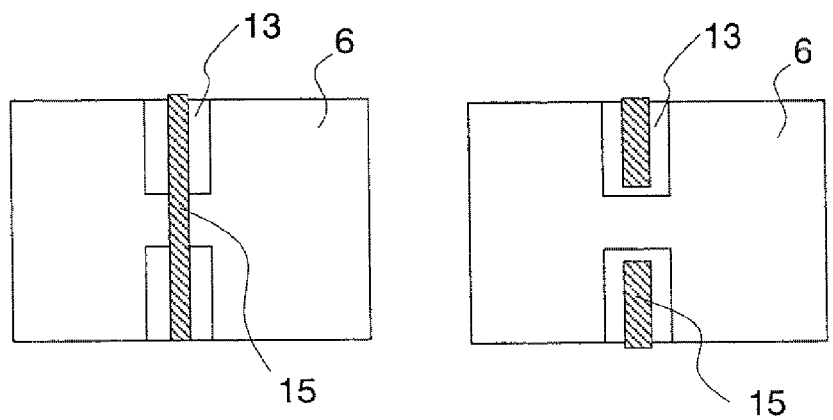
FIG. 3 (a) to (c) are diagrams for explaining preferable constructions of recessed portions 13 and wall structures 15 in a liquid crystal display device according to an embodiment of the present invention.
Figure 3:
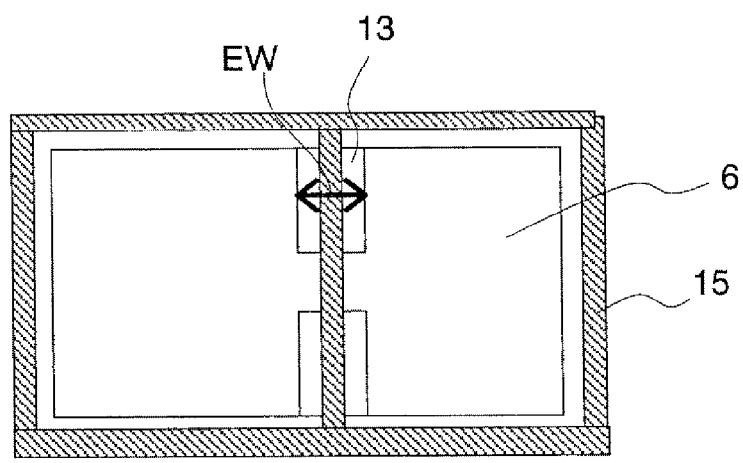
Figure 3:
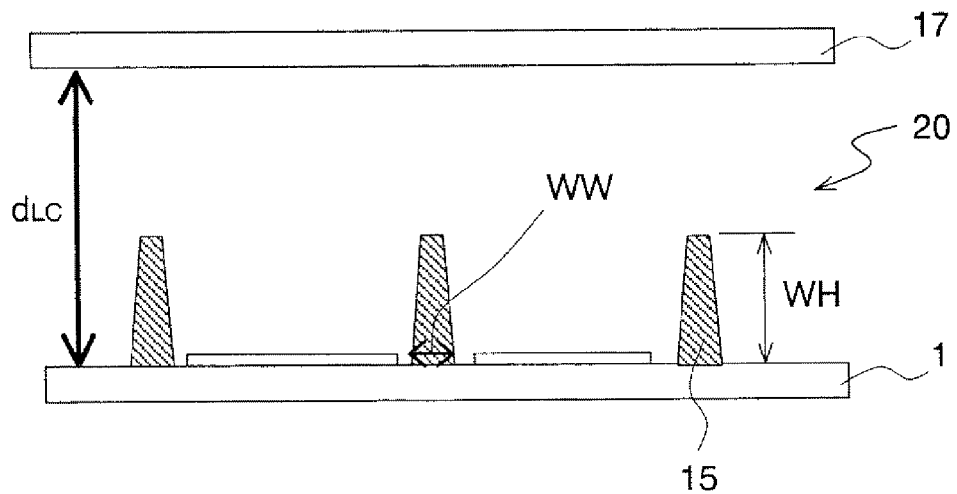

Although the action of oblique electric fields that are generated around the apertures 14 is described herein, an oblique electric field will be similarly generated near any recessed portion that is formed at an edge of the pixel electrode 6 (see, for example, recessed portions 13 in FIG. 3 described later), thus defining the direction in which the liquid crystal molecules 21 are tilted by the electric field.

Next, with reference to FIGS. 3(a) to (c), the positioning of the recessed portions 13 (or apertures 14) and the wall-like structures 15 will be described. FIGS. 3(a) and (b) are plan views showing examples of how the wall-like structures 15 may be positioned in the case where a pair of rectangular recessed portions 13 are provided near the center of the pixel electrode 6. Note that the following description similarly applies also in the case where the recessed portions 13 described herein are apertures 14 formed in the pixel electrode 6.

As mentioned above, each region where a liquid crystal domain that takes radially-inclined orientation under an applied voltage (note that a region which forms one liquid crystal domain may be referred to as a "subpixel") is formed does not need to be surrounded by the wall-like structures 15 around all of its periphery. Therefore, the wall-like structures 15 may be formed only in the recessed portions 13 (or in the apertures 14), as shown at the right-hand side of FIG. 3(a); or a wall-like structure 15 may extend so as to connect between wall-like structures 15 which are formed in the recessed portions 13, as shown at the left-hand side of FIG. 3(a). In other words, the wall-like structures 15 may be appear to be a dotted line or a solid line when viewed from a substrate normal direction.

Next, with reference to FIGS. 3(b) and (c), a preferable construction in the case where the wall-like structures 15 are provided within and in parallel to the rectangular recessed portions 13 (or apertures 14) will be described.

Assuming that each rectangular recessed portion 13 has a width EW (FIG. 3(b)) and each wall-like structure 15 has a width WW, it is preferable that they are constructed so as to satisfy the relationship $0.6EW<WW<0.9EW$. When $WW<0.6EW$, the influence which the orientation restriction forces due to the wall-like structures 15 exert on the liquid crystal domain may become small, thus making it difficult to stabilize the liquid crystal domains. Conversely, when $0.9EW<WW$, there may occur a situation where the wall-like structures 15 are not positioned within the recessed portions 13 (misalignment), due to alignment error during the production process.

Moreover, relative to the thickness $d_{LC}$ of the liquid crystal layer 20, it is preferable that the recessed portion width EW satisfies $1.8d_{LC}<EW<2.5d_{LC}$. In order to ensure a stable orientation in each pixel with an oblique electric field that is generated by an applied voltage, is preferable that the recessed portion width EW is large relative to the thickness $d_{LC}$ of the liquid crystal layer, thus sufficiently distorting the equipotential lines in any region where the electrically-conductive film of the pixel electrode 6 does not exist.

However, if the width EW of each recessed portion 13 (or aperture 14) is made too large, the portions in the pixel that contribute to display become small, and the regions which undergo a change in displaying state under an applied voltage are reduced, which is not preferable. On the other hand, decreasing the thickness $d_{LC}$ of the liquid crystal layer would increase the amount of change in the electric field per unit thickness, thus resulting in substantially the same effect as in the case of increasing the recessed portion width EW.

In other words, for a given cell thickness (i.e., the thickness of the liquid crystal layer 20), in order to create good radially-inclined orientation domains in each pixel and increase the effective aperture ratio (i.e., the proportion of an area substantially contributing to display, relative to the pixel area) as much as possible, it is preferable that the recessed portion width EW and the thickness $d_{LC}$ of the liquid crystal layer 20 satisfy the relationship $1.8d_{LC}<EW<2.5d_{LC}$. When $1.8d_{LC}>EW$, the electric field per unit thickness is weak, and therefore the radially-inclined orientation within the pixel is not stabilized, so that the positions of the centers of radially-inclined orientation may fluctuate among a plurality of pixels. Conversely, when $EW>2.5d_{LC}$, the effective aperture ratio will become lower because of the recessed portions 13 (or apertures 14) being too large relative to the appropriate thickness of the liquid crystal layer 20, which is not preferable.

Moreover, it is preferable that the height WH of each wall-like structure 15 satisfies $0.25d_{LC}<WH<0.4d_{LC}$ relative to the thickness $d_{LC}$ of the liquid crystal layer 20. When $WH<0.25d_{LC}$, the orientation restriction forces due to the wall-like structures 15 become weak, so that a stable orientation state may not be obtained. Conversely, when WH>0.4$d_{LC}$, the wall-like structures 15 regularly arranged on the pixel electrode 6 will hinder liquid crystal injection when injecting the liquid crystal material in between the substrate 1 and the substrate 17, so that the injection may take a long time and regions of imperfect injection may occur.

Although the above example illustrates a construction where the wall-like structures 15 are provided so as to correspond to the recessed portions 13 and/or apertures 14, this is not a limitation. As shown in FIG. 3(b), wall-like structures 15 may be provided in a region surrounding the pixel electrode 6. The region around the pixel electrode 6 will be a light-shielding region not contributing to display because, for example, TFTs, gate bus lines, source bus lines, and the like are formed, or because a black matrix is formed on the counter substrate. Therefore, the wall-like structures 15 formed in this region will not unfavorably affect displaying.

Moreover, wall-like structures 15 may be formed so as to substantially surround the region (subpixel) forming each individual liquid crystal domain. Unless wall-like structures 15 are formed for each subpixel, the orientation restriction forces due to the recessed portions 13 or the apertures 14 may not be sufficient under a low voltage, thus allowing the positions of the centers of radially-inclined orientation of the liquid crystal domains to fluctuate among a plurality of pixels, instead of steadily maintaining them.

Particularly in the case of a transmission/reflection combination type liquid crystal display device, preferable to provide apertures 14 or recessed portions 13 at least between the transmission region and the reflection region, and it is further preferable to form wall-like structures 15 in the alternative or in addition. When wall-like structures 15 are not formed between the transmission region and the reflection region, under a low applied voltage, the orientation restriction forces may be stronger in the region in which the wall-like structures 15 are formed than in the other, so that the position of the center of radially-inclined orientation may deviate from the center of a subpixel in the transmission region or the reflection region.

Up to here, the action of the orientation restriction structures (i.e., wall-like structures, apertures or recessed portions in the electrode) which are provided on the one substrate has been described. The liquid crystal display device of the present embodiment further includes protrusions on the other substrate, the protrusions projecting toward the liquid crystal layer. Since the orientations of liquid crystal molecules are restricted from both of the upper and lower substrates opposing each other via the liquid crystal layer, the radially-inclined orientation is further stabilized. Hereinafter, the action of the protrusions will be described with reference to the drawings.

Figure 4:
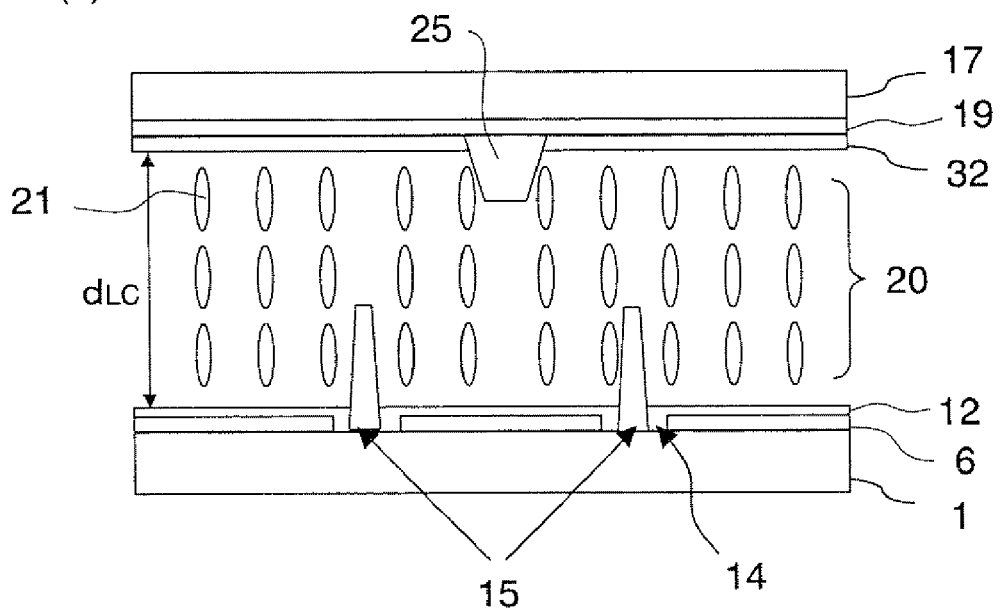
FIG. 4 Schematic illustrations for explaining operation principles of a liquid crystal display device according to an embodiment of the present invention, where: (a) illustrates absence of an applied voltage; and (b) illustrates presence of an applied voltage.
Figure 4:
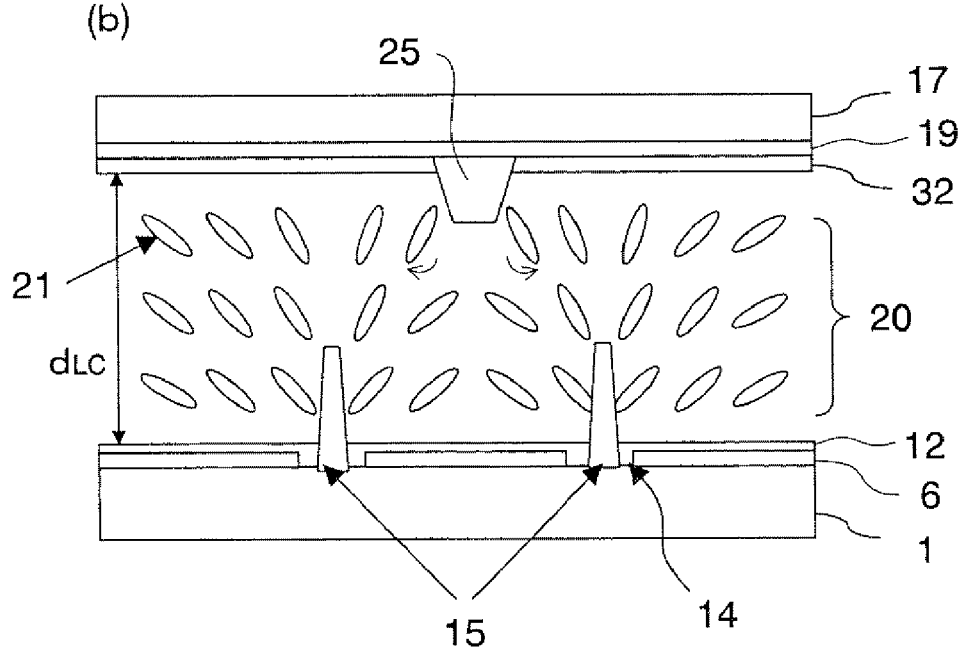

As shown in FIG. 4(a), the liquid crystal display device of the present embodiment further includes a protrusion (dielectric structure) 25 on the substrate 17, which opposes the substrate 1 having the wall-like structures 15 thereon. Therefore, due to the orientation restriction forces (anchoring effect) from the side slopes of the protrusion 25 projecting toward the liquid crystal layer 20, the radially-inclined orientation of the liquid crystal molecules 21 is further stabilized. Note that, although in simplified illustration in FIG. 4(a), the vertical alignment film 32 is typically formed so as to cover the protrusion 25.

As can be seen from FIG. 4(b), the orientation restriction force due to the protrusion 25 provided on the upper substrate 17 acts to orient the liquid crystal molecules 21 in the same direction as the orientation restriction forces due to the orientation restriction structures provided on the lower substrate 1 (i.e., the wall-like structures 15, the apertures 14 or recessed portions 13 in the electrode 6), so that the radially-inclined orientation of the liquid crystal molecules 21 in the subpixel is further stabilized. Moreover, since the radially-inclined orientation is created around the protrusion 25 which is provided in the substantial center of a subpixel (i.e., the protrusion 25 is provided in a region corresponding to the substantial center of a liquid crystal domain), the center of radially-inclined orientation is fixed near the protrusion 25.

Thus, the radially-inclined orientation can be stabilized by: restricting the orientation directions of, mainly, the liquid crystal molecules around the subpixel with the orientation restriction structures provided on the one substrate (i.e., wall-like structures, apertures or recessed portions in the electrode); and restricting the orientations of the liquid crystal molecules at the substantial center of the subpixel with the orientation restriction structure (protrusion) provided on the other substrate. This makes it possible to shorten the response time in gray-scale displaying, and the time in which a disturbance in orientation resulting from pressing the panel surface is eliminated. The reason therefor will be described with reference to FIGS. 5(a) to (c).

Figure 5:
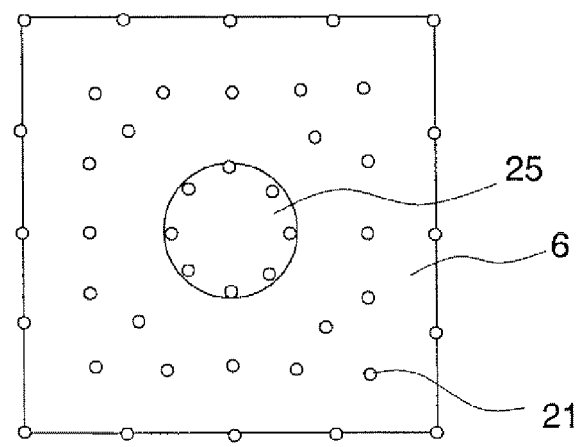
FIG. 5 Diagrams schematically showing orientations of liquid crystal molecules within a subpixel of a liquid crystal display device according to an embodiment of the present invention, where: (a) illustrates a state in the absence of an applied voltage; (b) illustrates a state immediately after voltage application; and (c) illustrates a state after the lapse of a sufficient time from voltage application.
Figure 5:
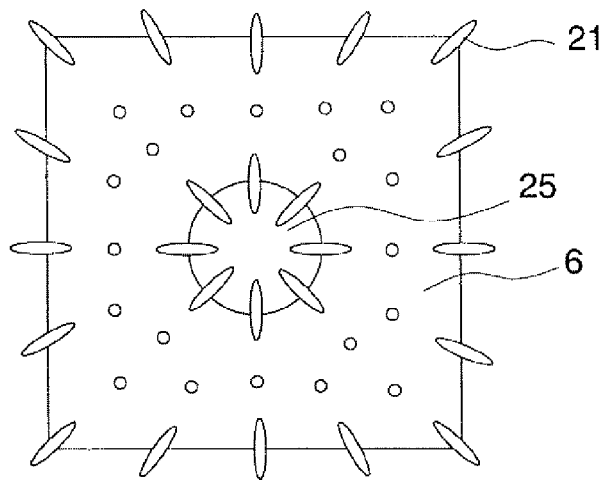
Figure 5:
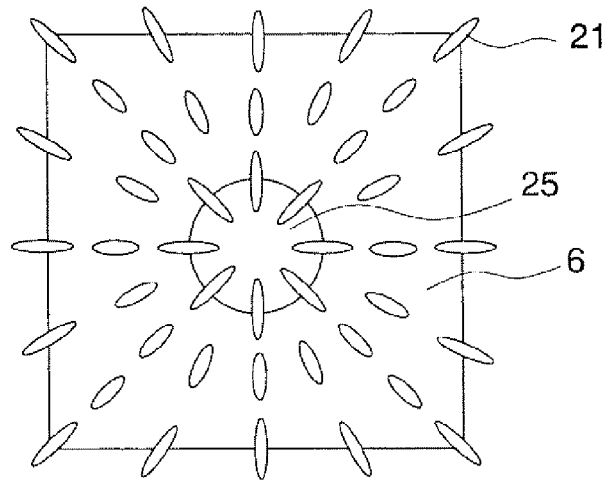

FIGS. 5(a) to (c) are diagrams schematically showing the orientations of liquid crystal molecules within a subpixel of the liquid crystal display device of the present embodiment, where: (a) illustrates a state in the absence of an applied voltage; (b) illustrates a state immediately after voltage application; and (c) illustrates a state after the lapse of a sufficient time from voltage application.

As shown in FIG. 5(a), in the absence of an applied voltage, the liquid crystal molecules 21 are aligned almost perpendicularly to the substrate plane. Note that the liquid crystal molecules 21 near the side slopes of the protrusion are inclined (pretilted) because of trying to align perpendicularly to the side slopes, although obscured in the figure.

When a voltage is applied, as shown in FIG. 5(b), tilting begins from the liquid crystal molecules 21 at the periphery of the subpixel, which are susceptible to the orientation restriction forces of the orientation restriction structures provided at the periphery of the subpixel, and the liquid crystal molecules 21 near the center, which are susceptible to the orientation restriction force of the protrusion 25.

Thereafter, with lapse of time, the liquid crystal molecules 21 which exist between the orientation restriction structures provided at the periphery of the subpixel and the protrusion 25 become oriented in a continuous manner, whereby a liquid crystal domain as shown in FIG. 5(c) is formed.

Thus, since the protrusion 25 is provided at the substantial center of the subpixel, orientation restriction on the liquid crystal molecules progresses from the orientation restriction structures both near the protrusion 25 and around the subpixel. As a result, an effect reducing the response time in a gray-scale displaying state and an effect of increasing the restoring force against a panel pressing are obtained.

The inventors have produced liquid crystal display devices having the above-described basic construction, while changing various cell parameters, and evaluated persistence of display unevenness when the panel surface is pressed. From this, it has been found that: in the case where the thickness $d_{LC}$ of the liquid crystal layer 20, the natural chiral pitch p of the liquid crystal layer 20, and the distance $d_{RW}$ from the center of the protrusion 25 to the wall-like structures 15 satisfy the relationships $d_{RW}$>p and $d_{LC}/p \geqq 0.15$, reorientation of liquid crystal molecules easily occurs even when the panel surface is pressed to cause a disturbance in orientation, and display unevenness is eliminated in a short period of time. Hereinafter, this finding will be described more specifically.

Figure 6:
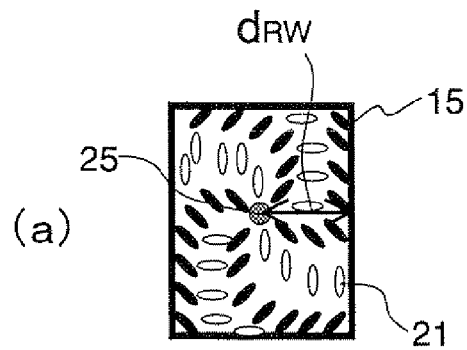
FIGS. 6 (a) and (b) are a schematic diagram and a micrograph showing a normal orientation state when a voltage is applied across a liquid crystal layer containing a chiral agent.
Figure 6:
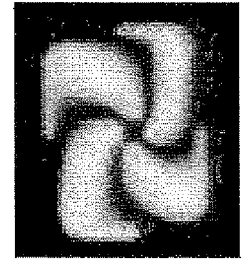

In the case where the liquid crystal layer 20 contains a chiral agent, the liquid crystal molecules 21 in the liquid crystal domain form a twisted orientation structure (spiral radially-inclined orientation), as shown in a schematic diagram of FIG. 6(a) and a micrograph of FIG. 6(b). In a normal orientation state, as shown in FIG. 6(a), the liquid crystal molecules 21 are oriented almost point symmetrically around the protrusion 25.

Figure 7:
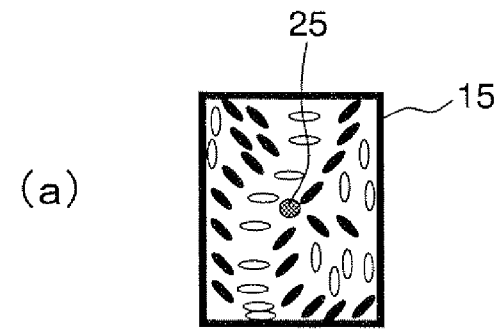
FIGS. 7 (a) and (b) are a schematic diagram and a micrograph showing an abnormal (i.e. when the panel surface is pressed) orientation state when a voltage is applied across a liquid crystal layer containing a chiral agent.
Figure 7:
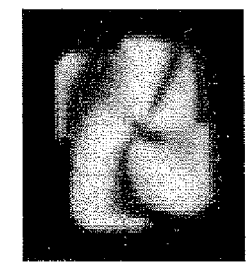
Figure 8:
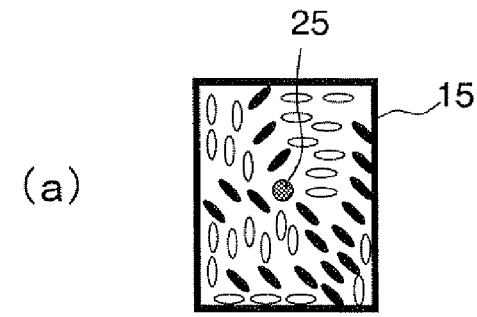
FIGS. 8 (a) and (b) are a schematic diagram and a micrograph showing an abnormal (i.e. when the panel surface is pressed) orientation state when a voltage is applied across a liquid crystal layer containing a chiral agent.
Figure 8:
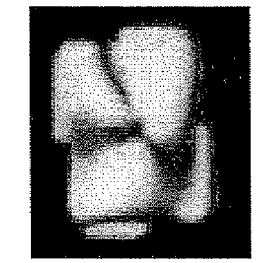
Figure 9:
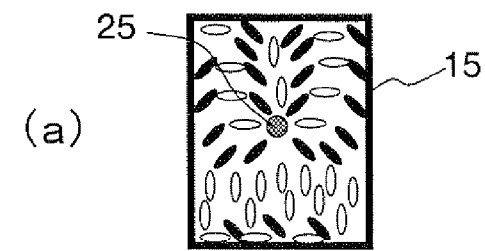
FIGS. 9 (a) and (b) are a schematic diagram and a micrograph showing an abnormal (i.e. when the panel surface is pressed) orientation state when a voltage is applied across a liquid crystal layer containing a chiral agent.
Figure 9:
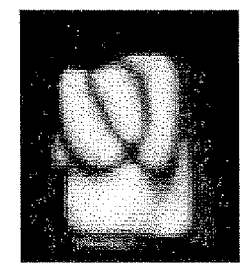

On the other hand, when the panel surface is pressed, as shown in FIG. 7, FIG. 8, and FIG. 9, the orientation is disturbed, thus resulting in a distorted orientation state. Since the orientation state differs from pixel to pixel, the orientation becomes discontinuous between pixels, whereby display unevenness occurs.

In the liquid crystal display device of the present embodiment, the thickness $d_{LC}$ of the liquid crystal layer 20, the natural chiral pitch p of the liquid crystal layer 20, and the distance $d_{RW}$ from the center of the protrusion 25 to the wall-like structures 15 satisfy the relationships $d_{RW} > p$ and $d_{LC}/p \geq 0.15$. In other words, the natural chiral pitch p of the liquid crystal layer 20 is prescribed to be smaller than the distance (shortest distance) $d_{RW}$ (see FIG. 6(a)) from the center of the protrusion 25 to the wall-like structures 15, and not too large (specifically, 1/0.15 times or less) relative to the thickness $d_{LC}$ of the liquid crystal layer 20. Thus, by prescribing the natural chiral pitch p to be equal to or less than a certain value, twist structures of liquid crystal molecules 21 become likely to occur within the pixel, so that even when the panel surface is pressed to cause a disturbance in orientation, reorientation of the liquid crystal molecules 21 easily occurs, and display unevenness is eliminated in a short period of time. Moreover, since stability of radially-inclined orientation is improved such that normal orientation is easily maintained, occurrence of display unevenness is in itself suppressed.

Table 1 shows some of the results of studying persistence of display unevenness while actually varying the thickness $d_{LC}$ of the liquid crystal layer 20, the natural chiral pitch p of the liquid crystal layer 20, and the distance $d_{RW}$ from the center of the protrusion 25 to the wall-like structures 15. Note that the data shown in Table 1 is study results on a gray-scale displaying state (light transmittance 20%).

Figure 10:
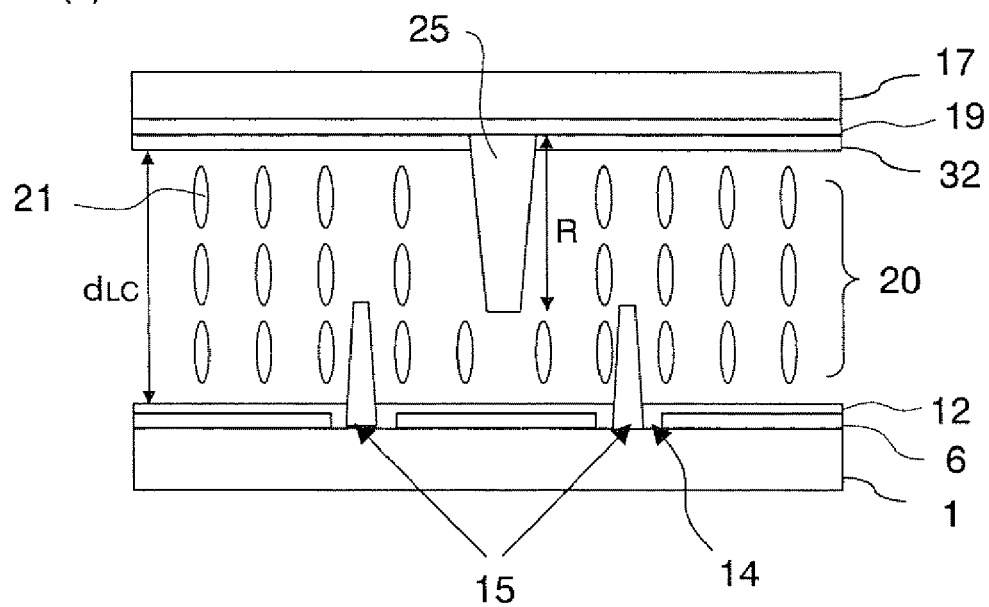
FIG. 10 Diagrams schematically showing a liquid crystal display device according to an embodiment of the present invention, where: (a) illustrates absence of an applied voltage; and (b) illustrates presence of an applied voltage.
Figure 10:
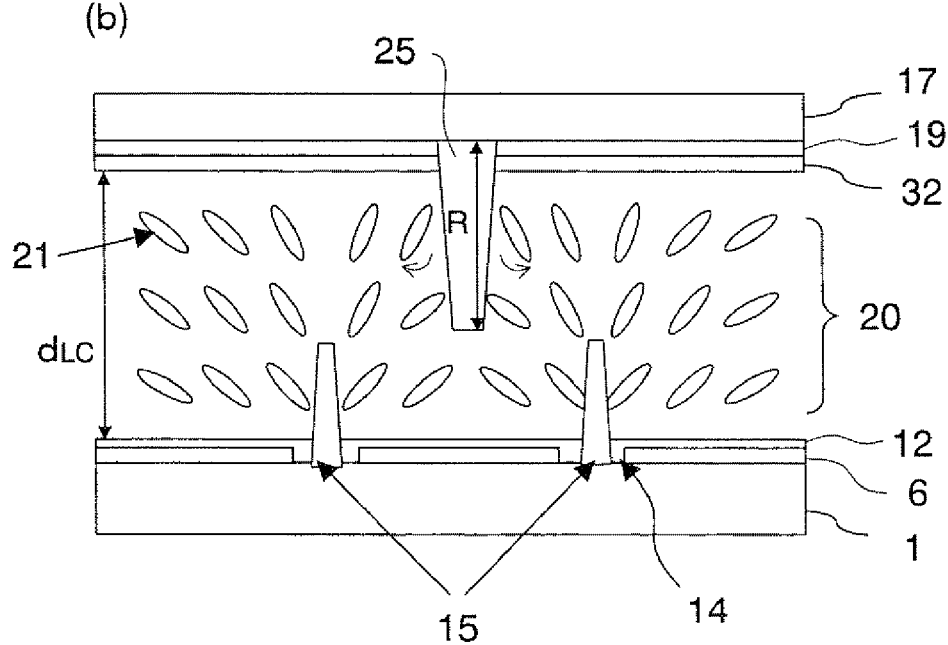

Specifically, as shown in FIG. 10, is preferable that the thickness $d_{LC}$ of the liquid crystal layer 20 and the height R of the protrusion 25 satisfy the relationship $0.5 \leq R/d_{LC} < 1$ (i.e. the height R of the protrusion 25 is prescribed to be equal to or greater than a half of the thickness $d_{LC}$ of the liquid crystal layer 20). Thus, by prescribing the height R of the protrusion 25 to be equal to or greater than a predetermined value, the orientation restriction force of the protrusion 25 (due to an anchoring action of the surface of the protrusion 25) increases; therefore, even when the panel surface is pressed to cause a disturbance in orientation, reorientation of the liquid crystal molecules 21 is easy to occur, so that display unevenness is easily eliminated. Moreover, since stability of radially-inclined orientation is improved such that normal orientation is easily maintained, occurrence of display unevenness is in itself suppressed.

Table 2 shows some of the results of studying persistence of display unevenness while actually varying the thickness $d_{LC}$ of the liquid crystal layer 20 and the height R of the protrusion 25. Note that the data shown in Table 2 is study results on a gray-scale displaying state (light transmittance 10%).

TABLE 2

| displaying state | gray scale: transmittance 10% | | |
|---|---|---|---|
| thickness $d_{LC}$ of liquid crystal layer | 3.4 μm | | |
| height R of protrusion | 1.1 μm | 1.3 μm | 1.9 μm |
| $R/d_{LC}$ | 0.32 | 0.38 | 0.56 |
| time from pressing till display unevenness is eliminated | not eliminated | not eliminated | 70-90 sec |

In the example shown in Table 2, the relationship $0.5 \leq R/d_{LC} < 1$ was satisfied when the height R of the protrusion 25 was 1.9 μm, so that the display unevenness occurring when the panel surface was pressed was eliminated. On the other hand, when the height R of the protrusion 25 was 1.1 μm or 1.3 μm, the relationship $0.5 \leq R/d_{LC} < 1$ was not satisfied, and display unevenness was not eliminated.

TABLE 1

| displaying state | gray scale: transmittance 20% | | | | | |
|---|---|---|---|---|---|---|
| distance $d_{RW}$ from center of protrusion to wall-like structure | 35 μm | | | | | |
| natural chiral pitch p | 20 μm | | 40 μm | | 60 μm | |
| thickness $d_{LC}$ of liquid crystal layer | 3.4 μm | 4 μm | 3.4 μm | 4 μm | 3.4 μm | 4 μm |
| $d_{LC}/p$ | 0.17 | 0.20 | 0.085 | 0.10 | 0.056 | 0.067 |
| time from pressing till display unevenness is eliminated | 4-7 sec | 5-7 sec | not eliminated | not eliminated | not eliminated | not eliminated |

In the example shown in Table 1, the relationships $d_{RW} > p$ and $d_{LC}/p \geq 0.15$ were satisfied when the natural chiral pitch p was 20 μm, so that the display unevenness occurring when the panel surface was pressed was eliminated in a short period of time. On the other hand, in the case where the natural chiral pitch p was 40 μm or 60 μm, the relationships $d_{RW} > p$ and $d_{LC}/p \geq 0.15$ were not satisfied, and display unevenness was not eliminated.

The above discussion has been directed to a preferable relationship between the thickness $d_{LC}$ of the liquid crystal layer 20, the natural chiral pitch p of the liquid crystal layer 20, and the distance $d_{RW}$ from the center of the protrusion 25 to the wall-like structures 15. Next, a preferable relationship between the thickness $d_{LC}$ of the liquid crystal layer 20 and the height R of the protrusion 25 will be discussed.

As described above, according to the present invention, in a liquid crystal display device which presents display by forming liquid crystal domains that take radially-inclined orientation, it is possible to prevent persisting display unevenness from occurring when the panel surface is pressed, thus realizing high-quality displaying.

Next, a more specific example construction of the liquid crystal display device of the present embodiment will be described.

Figure 11:
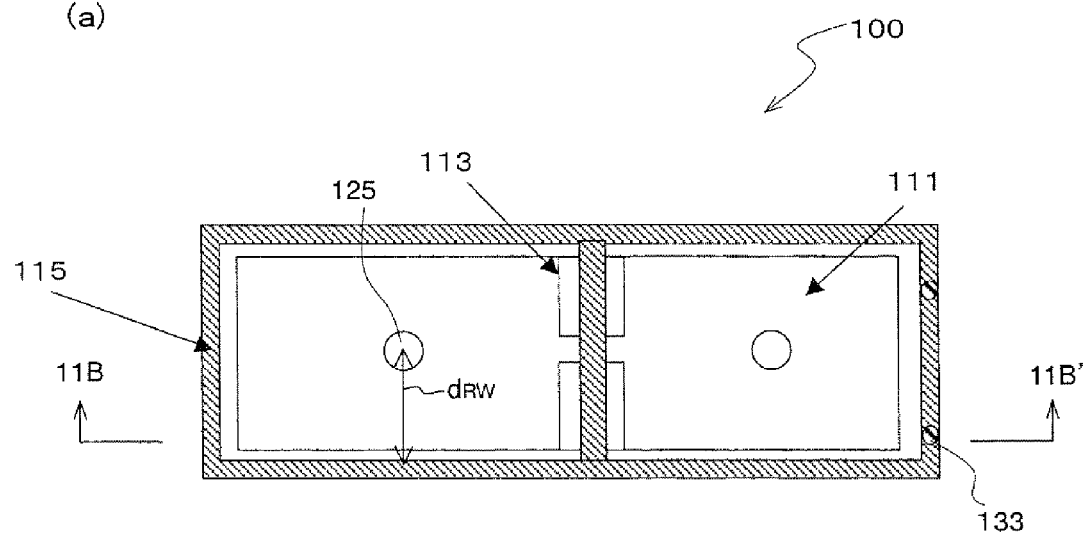
FIG. 11 A diagram schematically showing the construction of one pixel in a transmission type liquid crystal display device 100 according to a preferred embodiment of the present invention, where: (a) is a plan view; and (b) is a cross-sectional view taken along line 11B-11B' in (a).
Figure 11:
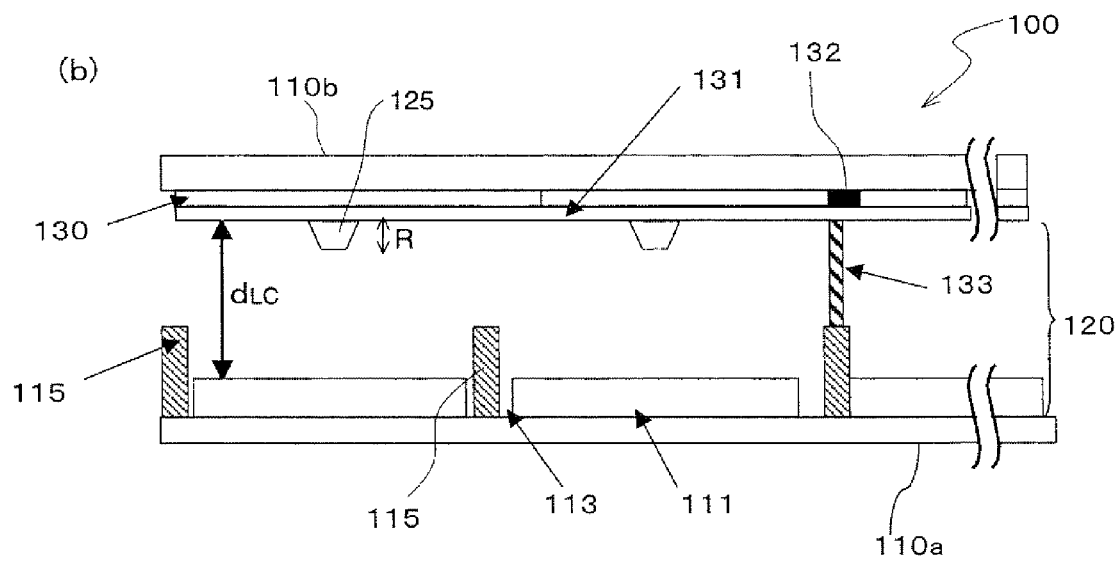

FIG. 11 schematically shows a transmission type liquid crystal display device 100 according to the present embodiment. FIG. 11(a) is a plan view schematically showing the construction of one pixel in the transmission type liquid crystal display device 100; and FIG. 11(b) is a cross-sectional view taken along line 11B-11B' in FIG. 11(a).

The liquid crystal display device 100 includes a transparent substrate (e.g., a glass substrate) 110a, a transparent substrate 110b provided so as to oppose the transparent substrate 110a, and a vertical-alignment type liquid crystal layer 120 provided between the transparent substrates 110a and 110b. Vertical alignment films (not shown) are provided on the surfaces of the substrates 110a and 110b which are in contact with the liquid crystal layer 120, so that, in the absence of an applied voltage, the liquid crystal molecules in the liquid crystal layer 120 are substantially perpendicularly aligned with respect to the surface of each vertical alignment film. The liquid crystal layer 120 contains a nematic liquid crystal material having a negative dielectric anisotropy, and further contains a chiral agent.

The liquid crystal display device 100 includes a pixel electrode 111 formed on the transparent substrate 110a and a counter electrode 131 formed on the transparent substrate 110b, such that the pixel electrode 111, the counter electrode 131, and the liquid crystal layer 120 provided therebetween define a pixel. Herein, the pixel electrode 111 and the counter electrode 131 are both composed of transparent conductive layers (e.g., ITO layers). Note that, typically, on the liquid crystal layer 120 side of the transparent substrate 110b, color filters 130 provided corresponding to pixels (a plurality of color filters may be collectively referred to as a color filter layer 130 as a whole), and a black matrix (light shielding layer) 132 provided between adjoining color filters 130, i.e., between adjoining pixels, and a counter electrode 131 is formed thereon; however, the color filter layer 130 and the black matrix 132 may be provided on the counter electrode 131 (at the liquid crystal layer 120 side).

Herein, the pixel electrode 111 includes two recessed portions 113 which are formed at predetermined positions. Moreover, wall-like structures 115 are provided on the liquid crystal layer 120 side of the transparent substrate 110a, such that the wall-like structures 115 include a wall portion which is provided so as to surround the pixel electrode 111, wall portions provided within and in parallel to the rectangular recessed portions 113, and further a wall portion extending so as to connect therebetween.

When a predetermined voltage is applied across the liquid crystal layer 120, two liquid crystal domains, each of which exhibits a radially-inclined orientation, are formed within the regions surrounded by the wall-like structures 115. Although the wall-like structures 115 illustrated herein are provided as a continuous wall, this is not a limitation; they may be split into a plurality of walls. Since the wall-like structures 115 act to define the boundaries of liquid crystal domains, it is preferable that they have some length. For example, in the case where the wall-like structures are composed of a plurality of walls, it is preferable that the length of each wall is longer than the length between adjoining walls.

Forming supports 133 for defining the thickness (also referred to as the cell gap) $d_{LC}$ the liquid crystal layer 120 in a light-shielding region is preferable because doing so will not detract from display quality. The supports 133 may be formed through a photolithography step by using a photosensitive resin, for example. The supports 133 may be formed on either of the transparent substrates 110a and 110b, and are not limited to being formed on the wall-like structures 115 which are provided in a light-shielding region as illustrated. In the case where the supports 133 are formed on the wall-like structures 115, it is ensured that the sum of the height of the wall-like structures 115 and the height of the supports 133 equals the thickness of the liquid crystal layer 120. In the case where the supports 133 are provided in regions where the wall-like structures 115 are not formed, it is ensured that the height of the supports 133 equals the thickness of the liquid crystal layer 120.

Note that, on the liquid crystal layer 120 side of the transparent substrate 110a, circuit elements are provided, e.g., active elements such as TFTs, and gate lines, source lines, and the like which are connected to TFTs (none of them is shown). Moreover, the transparent substrate 110a as well as the circuit elements formed on the transparent substrate 110a, and the aforementioned pixel electrodes 111, wall-like structures 115, supports 133, alignment films, and the like may be collectively referred to as an active matrix substrate. On the other hand, the transparent substrate 110b and the color filter layer 130, the black matrix 132, the counter electrode 131, the alignment film, and the like formed on the transparent substrate 110b may be collectively referred to as a counter substrate or a color filter substrate.

Although omitted from the above description, the liquid crystal display device 100 further includes a pair of polarizers disposed so as to oppose each other via the transparent substrates 110a and 110b. Typically, the pair of polarizers are disposed so that their transmission axes are orthogonal to each other. Furthermore, phase difference plates may be provided as necessary.

In the above-described transmission type liquid crystal display device 100, by prescribing the thickness $d_{LC}$ of the liquid crystal layer 120, the natural chiral pitch p of the liquid crystal layer 120, and the distance $d_{RW}$ from the center of the protrusion 125 to the wall-like structures 115 so as to satisfy the relationships $d_{RW} > p$ and $d_{LC}/p \geq 0.15$, display unevenness occurring when the panel surface is pressed can be eliminated in a short period of time.

Alternatively, by prescribing the thickness $d_{LC}$ of the liquid crystal layer 120 and the height R of the protrusion 25 so as to satisfy the relationship $0.5 \leq R/d_{LC} < 1$, display unevenness can also be easily eliminated.

Figure 12:
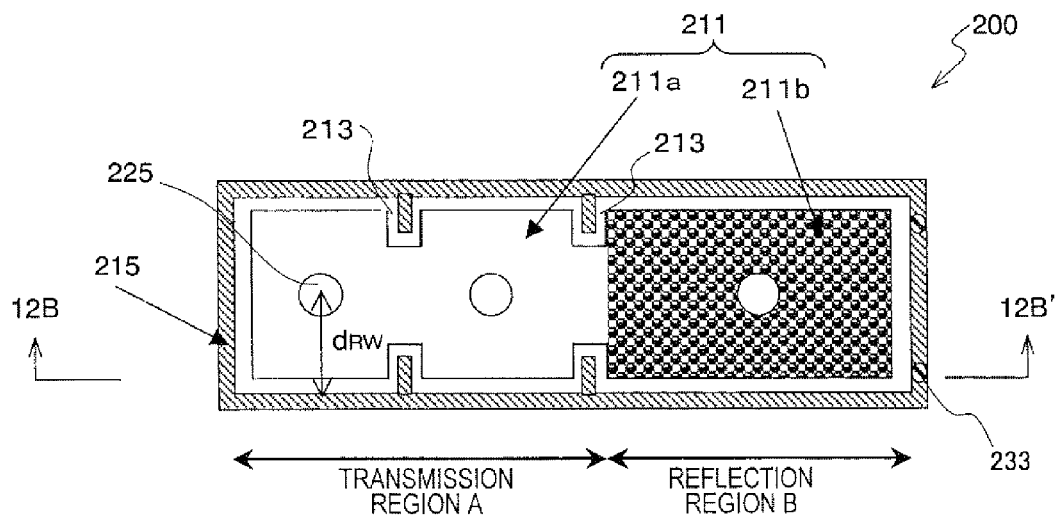
FIG. 12 A diagram schematically showing the construction of one pixel of a transmission/reflection combination type liquid crystal display device 200 according to a preferred embodiment of the present invention, where: (a) is a plan view; and (b) is a cross-sectional view taken along line 12B-12B' in (a).
Figure 12:
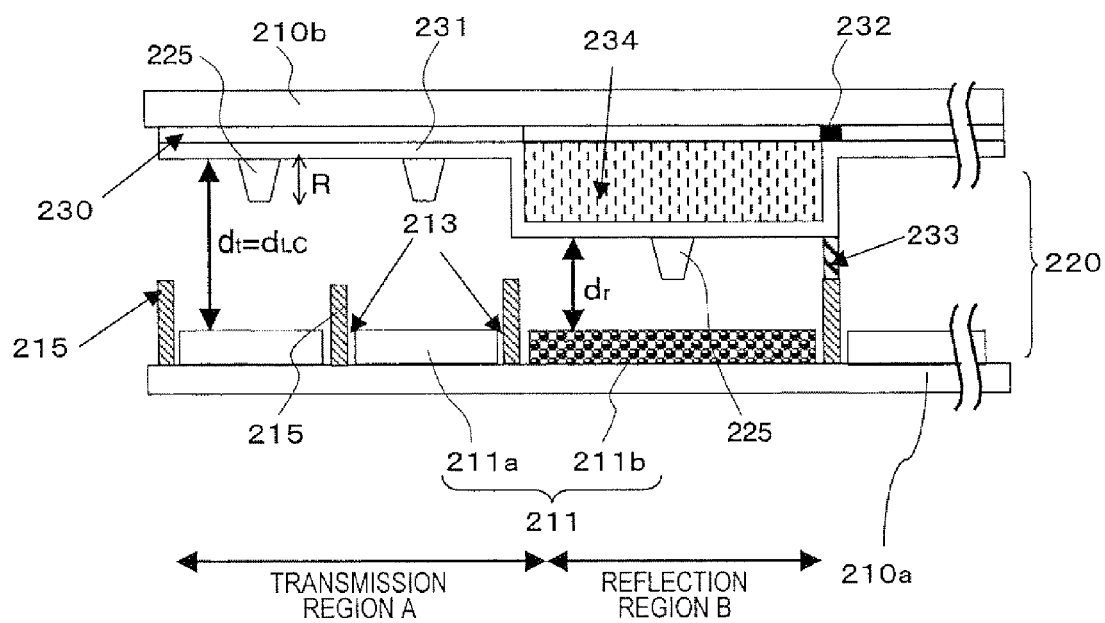

FIG. 12 shows a transmission/reflection combination type liquid crystal display device 200 according to the present embodiment. FIG. 12(a) is a plan view schematically showing the construction of one pixel in the transmission/reflection combination type liquid crystal display device 200; and FIG. 12(b) is a cross-sectional view taken along line 12B-12B' in FIG. 12(a).

The liquid crystal display device 200 includes a transparent substrate (e.g., a glass substrate) 210a, a transparent substrate 210b provided so as to oppose the transparent substrate 210a, and a vertical-alignment type liquid crystal layer 220 provided between the transparent substrates 210a and 210b. On the surface of each of the substrates 210a and 210b that is in contact with the liquid crystal layer 220, a vertical alignment film (not shown) is provided so that, in the absence of an applied voltage, the liquid crystal molecules in the liquid crystal layer 220 are aligned substantially perpendicularly to the surface of the vertical alignment films. The liquid crystal layer 220 contains a nematic liquid crystal material having negative dielectric anisotropy, and further contains a chiral agent.

The liquid crystal display device 200 includes a pixel electrode 211 formed on the transparent substrate 210a and a counter electrode 231 formed on the transparent substrate 210b, such that the liquid crystal layer 220, the pixel electrode 211, and the counter electrode 231 provided therebetween define a pixel. On the transparent substrate 210a, circuit elements such as TFTs are formed as described later. The transparent substrate 210a and the component elements provided thereon may be collectively referred to as an active matrix substrate 210a.

Typically, on the liquid crystal layer 220 side of the transparent substrate 210b, color filters 230 provided corresponding to the pixels (a plurality of color filters may be collectively referred to as a color filter layer 230 as a whole), and a black matrix (light shielding layer) 232 provided between adjoining color filters 230 (i.e., between adjoining pixels) are formed, and the counter electrode 231 is formed thereupon. Alternatively, the color filter layer 230 and the black matrix 232 may be formed upon the counter electrode 231 (on the liquid crystal layer 220 side). The transparent substrate 210b and the component elements formed thereon may be collectively referred to as a counter substrate (color filter substrate) substrate 210b.

The pixel electrode 211 includes a transparent electrode 211a composed of a transparent conductive layer (e.g., an ITO layer) and a reflection electrode 211b composed of a metal layer (e.g., an Al layer, an alloy layer containing Al, or a multilayer film containing either of these). As a result, the pixel includes a transmission region A defined by the transparent electrode 211a and a reflection region B defined by the reflection electrode 211b. The transmission region A presents display in a transmission mode, whereas the reflection region B presents display in a reflection mode.

Herein, the pixel electrode 211 includes recessed portions 213 formed in predetermined positions. Moreover, wall-like structures 215 are provided on the liquid crystal layer 220 side of the transparent substrate 210a, such that the wall-like structures 215 include a wall portion which is provided so as to surround the pixel electrode 211, wall portions provided within and in parallel to the rectangular recessed portions 213, and a wall portion extending so as to connect therebetween.

When a predetermined voltage is applied across this liquid crystal layer, three liquid crystal domains, each of which exhibits a radially-inclined orientation, are formed within the regions surrounded by the wall-like structures 215. Although the wall-like structures 215 illustrated herein are provided as a continuous wall, this is not a limitation; they may be split into a plurality of walls. Since the wall-like structures 215 act to define the boundary of liquid crystal domains, it is preferable that they have some length. For example, in the case where the wall-like structures are composed of a plurality of walls, it is preferable that the length of each wall is longer than the length between adjoining walls.

Although FIG. 12 illustrates an example where two liquid crystal domains are formed in the transmission region A and one liquid crystal domain is formed in the reflection region B, this is not a limitation. Note that it is preferable from the standpoints of viewing angle characteristics and orientation stability that each liquid crystal domain has a generally square shape.

The liquid crystal display device 200 includes wall-like structures 215 on the transparent substrate 210a, in the light-shielding regions which are provided between adjoining pixels. Although the wall-like structures 215 illustrated herein are provided as a continuous wall surrounding the pixel, this is not a limitation; they may be split into a plurality of walls. Since the wall-like structures 215 act to define boundaries of each liquid crystal domain formed near the outer periphery of the pixel, it is preferable that they have some length. For example, in the case where the wall-like structures 215 are composed of a plurality of walls, it is preferable that the length of each wall is longer than the length between adjoining walls.

Forming the supports 233 for defining the thickness (also referred to as the cell gap) $d_{LC}$ of the liquid crystal layer 220 in a light-shielding region is preferable because doing so will not detract from display quality. The supports 233 may be formed through a photolithography step by using a photosensitive resin, for example. The supports 233 may be formed on either of the transparent substrates 210a and 210b, and are not limited to being formed on the wall-like structures 215 which are provided in a light-shielding region as illustrated. In the case where the supports 233 are formed on the wall-like structures 215, it is ensured that the sum of the height of the wall-like structures 215 and the height of the supports 233 equals the thickness of the liquid crystal layer 220. In the case where the supports 233 are provided in regions where the wall-like structures 215 are not formed, it is ensured that the height of the supports 233 equals the thickness of the liquid crystal layer 220.

Next, a preferable construction which is unique to the transmission/reflection combination type liquid crystal display device 200 capable of both displaying in the transmission mode and displaying in the reflection mode will be described.

In the transmission mode displaying, the light used for displaying passes through the liquid crystal layer 220 only once, whereas in the reflection mode displaying, the light used for displaying passes through the liquid crystal layer 220 twice. Therefore, as schematically shown in FIG. 12(b), it is preferable to prescribe the thickness dt of the transmission region A of the liquid crystal layer 220 to be about twice the thickness dr of the reflection region B of the liquid crystal layer 220. By so prescribing, it can be ensured that the liquid crystal layer 220 imparts substantially equal retardation to light in both display modes. Although dt=0.5dr is the most preferable, good displaying in both display modes can be realized in the range of 0.3dt<dr<0.7dt. It will be appreciated that dt=dr may be adopted depending on the purpose.

In the liquid crystal display device 200, in order to ensure that the thickness dr of the reflection region B of the liquid crystal layer 220 is smaller than the thickness dt of the transmission region A of the liquid crystal layer, a transparent dielectric layer 234 is provided only in the reflection region B of the glass substrate 210b. Note that, as shown, it is preferable that the counter electrode 231 is provided so as to cover the transparent dielectric layer 234 (i.e., so as to be on the liquid crystal layer 220 side).

When adopting such a construction in which the transparent dielectric layer 234 is provided on the counter substrate 210b side, it is unnecessary to provide a stepped portion under the reflection electrode 211b by using an insulative film or the like, thus realizing an advantage of simplifying the production of the active matrix substrate 210a. Notably, when the reflection electrode 211b is provided on an insulative film used to provide a stepped portion for thickness adjustment of the liquid crystal layer 220, problems will occur such as the light used for transmissive displaying being shielded by a reflection electrode that covers the slope (tapered portion) of the insulative film, or the light reflected by a reflection electrode that is formed on the slope of the insulative film repeating internal reflection and not being effectively utilized for reflective displaying. However, these problems will be alleviated by the above-described construction, thus improving the efficiency of light utility. Note that it is not necessary that a stepped portion be provided on the counter substrate 210b side; a stepped portion may be provided on the active matrix substrate 210a side.

Furthermore, when adopting a transparent dielectric layer 234 that has a function of scattering light (diffuse reflection function), is possible to realize a good white displaying state close to paper white, without having to impart a diffuse reflection function to the reflection electrode 211b. Even if a light scattering function is not imparted to the transparent dielectric layer 234, by introducing ruggedness to the surface of the reflection electrode 211b, it would be possible to realize a white displaying state close to paper white; however, depending on the shape of ruggedness, the position of the center of radially-inclined orientation may become unstable. On the other hand, when a transparent dielectric layer 234 having a light scattering function and a reflection electrode 211b having a flat surface are used, there is provided an advantage in that the position of the center can be made more stabilized because of the apertures formed in the reflection electrode 211b. In the case where ruggedness is formed on the surface of the reflection electrode 211b in order to impart a diffuse reflection function to the reflection electrode 211b, the ruggedness preferably has a continuous sinuous shape for preventing interference colors, and is preferably set so that the center of radially-inclined orientation can be stabilized.

Moreover, light used for displaying passes through the color filter layer 230 only once in the transmission mode, whereas light used for displaying passes through the color filter layer 230 twice during displaying in the reflection mode. Therefore, if color filter layers of the same optical density are used as the color filter layer 230 for the transmission region A and the reflection region B, the color purity and/or brightness in the reflection mode may be lowered. In order to prevent this problem, it is preferable ensure that the optical density of the color filter layer in the reflection region is smaller than that of the color filter layer in the transmission region. As used herein, optical density is a characteristic value that characterizes the color filter layer. The optical density can be decreased by decreasing the thickness of the color filter layer. Alternatively, while keeping the thickness of the color filter layer intact, the optical density can be decreased by lowering the concentration of a dye to be added, for example.

In the above-described transmission/reflection combination type liquid crystal display device 200, by prescribing the thickness $d_{LC}$ of the liquid crystal layer 220, the natural chiral pitch p of the liquid crystal layer 220, and the distance $d_{RW}$ from the center of the protrusion 225 to the wall-like structures 215 so as to satisfy the relationships $d_{RW}>p$ and $d_{LC}/p\geq 0.15$, display unevenness occurring when the panel surface is pressed can be eliminated in a short period of time.

Alternatively, display unevenness can also be easily eliminated by prescribing the thickness $d_{LC}$ of the liquid crystal layer 220 and the height R of the protrusion 225 so as to satisfy the relationship $0.5\leq R/d_{LC}<1$.

Note that, in the transmission/reflection combination type liquid crystal display device 200, it suffices if the thickness dt of the liquid crystal layer 220 in the transmission region A satisfies the aforementioned relational expressions (i.e. $dt=d_{LC}$).

INDUSTRIAL APPLICABILITY

According to the present invention, in a liquid crystal display device which presents display by forming liquid crystal domains that take radially-inclined orientation, it is possible to prevent persisting display unevenness from occurring when the panel surface is pressed, thus realizing high-quality displaying.

The present invention is suitably used for a liquid crystal display device in electronic equipment for mobile use whose panel surface is frequently pressed, and a liquid crystal display device for vehicle mounting that needs to be constantly presenting display.

The invention claimed is:

1. A liquid crystal display device comprising a first substrate, a second substrate provided so as to oppose the first substrate, and a vertical-alignment type liquid crystal layer provided between the first substrate and the second substrate;

the liquid crystal display device having a plurality of pixels, each pixel including a first electrode formed on the first substrate, a second electrode formed on the second substrate, and the liquid crystal layer provided between the first electrode and the second electrode;

the liquid crystal display device comprising wall-like structures regularly arranged on the liquid crystal layer side of the first substrate; and when a predetermined voltage is applied, the liquid crystal layer forming at least one liquid crystal domain that takes a radially-inclined orientation state in a region substantially surrounded by the wall-like structures, wherein, the wall-like structures appear as linear structures that substantially surround the at least one liquid crystal domain when viewed from a substrate normal direction, the second substrate includes a protrusion projecting toward the liquid crystal layer in a region corresponding to the liquid crystal domain;

the liquid crystal layer contains a chiral agent; and a thickness $d_{LC}$ of the liquid crystal layer, a natural chiral pitch p of the liquid crystal layer, and a distance $d_{RW}$ from a center of the protrusion to the wall-like structure satisfy the relationships $d_{RW}>p$ and $d_{LC}/p\geq 0.15$.

2. The liquid crystal display device of claim 1, wherein the thickness $d_{LC}$ of the liquid crystal layer and a height R of the protrusion satisfy the relationship $0.5\leq R/d_{LC}<1$.

3. The liquid crystal display device of claim 1, wherein the first electrode has a plurality of apertures or recessed portions formed in predetermined positions.

4. The liquid crystal display device of claim 3, wherein the wall-like structures are formed in the apertures or the recessed portions.

5. The liquid crystal display device of claim 4, wherein a width WW of the wall-like structure and a width EW of the aperture or the recessed portion substantially satisfy the relationship $0.6EW<WW<0.9EW$.

6. The liquid crystal display device of claim 4, wherein a width a width EW of the aperture or the recessed portion and the thickness $d_{LC}$ of the liquid crystal layer substantially satisfy the relationship $1.8d_{LC}<EW<1.8d_{LC}$.

7. The liquid crystal display device of claim 1, wherein the protrusion is provided in a region corresponding to a substantial center of the liquid crystal domain.

8. The liquid crystal display device of claim 1, wherein each of the plurality of pixels includes a transmission region for presenting display in a transmission mode and a reflection region for presenting display in a reflection mode.

9. The liquid crystal display device of claim 8, wherein the wall-like structures are formed between the transmission region and the reflection region.

10. The liquid crystal display device of claim 1 wherein the wall-like structures are formed in regions corresponding to light shielding regions.

11. The liquid crystal display device of claim 1, wherein the wall-like structures substantially physically surround the liquid crystal domain.

12. The liquid crystal display device of claim 1, wherein the protrusion is circularly shaped when viewed from the substrate normal direction.

13. A liquid crystal display device comprising a first substrate, a second substrate provided so as to oppose the first substrate, and a vertical-alignment type liquid crystal layer provided between the first substrate and the second substrate, the liquid crystal display device having a plurality of pixels, each pixel including a first electrode formed on the first substrate, a second electrode formed on the second substrate, and the liquid crystal layer provided between the first electrode and the second electrode;

the liquid crystal display device comprising wall-like structures regularly arranged on the liquid crystal layer side of the first substrate; and when a predetermined voltage is applied, the liquid crystal layer forming at least one liquid crystal domain that takes a radially-inclined orientation state in a region substantially surrounded by the wall-like structures, wherein, the wall-like structures appear as linear structures that substantially surround the at least one liquid crystal domain when viewed from a substrate normal direction, the second substrate includes a protrusion projecting toward the liquid crystal layer in a region corresponding to the liquid crystal domain; and a thickness $d_{LC}$ of the liquid crystal layer and a height R of the protrusion satisfy the relationship $0.5 \leq R/d_{LC} < 1$.

14. The liquid crystal display device of claim 13, wherein the protrusion is provided in a region corresponding to a substantial center of the liquid crystal domain, and the protrusion is circularly shaped when viewed from the substrate normal direction.

* * * * *